United States Patent [19]
Rogers

[11] Patent Number: 5,606,931
[45] Date of Patent: Mar. 4, 1997

[54] SPOT IDENTIFYING MARKER

[76] Inventor: Richard G. Rogers, RR 1 Box 188, Owensville, Ind. 47665

[21] Appl. No.: 292,218

[22] Filed: Aug. 19, 1994

[51] Int. Cl.⁶ .............................. E01F 9/017; E01F 9/019; G09F 17/00
[52] U.S. Cl. ........................ 116/209; 116/63 P; 116/173
[58] Field of Search ........................ 116/30, 63 P, 173, 116/209; 40/601, 610, 612

[56] References Cited

U.S. PATENT DOCUMENTS

| | | | |
|---|---|---|---|
| 2,002,756 | 5/1935 | Segelhorst | 40/612 X |
| 3,291,096 | 12/1966 | Walter | 116/63 P |
| 3,496,904 | 2/1970 | Rimkus | 116/63 P |
| 4,006,702 | 2/1977 | St. Cyr | 116/63 P |
| 4,799,448 | 1/1989 | Junker | 116/63 P |
| 4,858,551 | 8/1989 | Peters | 116/30 |
| 5,199,375 | 4/1993 | Johson | 116/209 |

FOREIGN PATENT DOCUMENTS

| | | | |
|---|---|---|---|
| 603348 | 3/1960 | Italy | 116/63 P |
| 69989 | 3/1991 | Japan | 116/173 |

*Primary Examiner*—William A. Cuchlinski, Jr.
*Assistant Examiner*—Willie Morris Worth

[57] ABSTRACT

A small, compact device which, when dropped or thrown from a moving vehicle, opens up and causes a visible flag or marker to be deployed at the upper end of a spring wire originally contained within the device. The device is formed of two mating cylindrical or spherical sections held together by a frangible or easily breakable bonding assembly which will fracture or open under the stress caused by dropping the device and subsequent contact with the ground. While riding or operating a piece of machinery, should a pothole be located or, if for any other reason, should the operator wish to mark a location, he merely drops one of these devices, the unit hits the ground, opens, and the marker deploys.

10 Claims, 4 Drawing Sheets

SPOT IDENTIFYING MARKER

BACKGROUND OF THE INVENTION

1. Field of the Invention

The present invention relates to location markers and more particularly pertains to such markers which may be easily carried by an individual and utilized by dropping or tossing to the ground.

2. Description of the Prior Art

The use of location markers is known in the prior art. More specifically, the majority of markers heretofore devised and utilized for the purpose of marking a given spot are known to consist basically of familiar, expected and obvious structural configurations, notwithstanding the myriad of designs encompassed by the crowded prior art which have been developed for the fulfillment of countless objectives and requirements, usually to define the location of a disabled vehicle for safety reasons. Typical of such prior art devices are those shown in U.S. Pat. Nos. 3,496,904; 4,799,448; 4,858,551; and 5,199,375.

In this respect, the marking device according to the present invention substantially departs from the conventional concepts and designs of the prior art, and in so doing provides an apparatus primarily developed for the purpose of making it easy for a user to carry a multiplicity of such devices and to easily deploy the same.

Therefore, it can be appreciated that there exists a continuing need for new and improved marking devices which are compact and essentially self-deploying. In this regard, the present invention substantially fulfills this need.

SUMMARY OF THE INVENTION

In view of the foregoing disadvantages inherent in the known types of marking devices now present in the prior art, the present invention provides an improved marker construction wherein the same can be utilized as one of a plurality of hand-carried devices and deployed from a moving vehicle. As such, the general purpose of the present invention, which will be described subsequently in greater detail, is to provide a new and improved spot marker apparatus which has all the advantages of the prior art devices and none of the disadvantages.

To attain this, the present invention essentially comprises: A small, compact device which, when dropped or thrown from a moving vehicle, opens up and causes a visible flag or marker to be deployed at the upper end of a spring wire originally contained within the device. The device is formed of two mating cylindrical or spherical sections held together by a frangible or easily breakable bonding means which will fracture or open under the stress caused by dropping the device and subsequent contact with the ground. While riding or operating a piece of machinery, should a pothole be located or, if for any other reason, should the operator wish to mark a location, he merely drops one of these devices, the unit hits the ground, opens, and the marker deploys.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved location marker which has all the advantages of the prior art devices and none of the disadvantages.

It is another object of the present invention to provide a new and improved spot location marker which may be easily and efficiently manufactured and marketed.

It is a further object of the present invention to provide a new and improved spot location marker which is of a durable and reliable construction.

An even further object of the present invention is to provide a new and improved spot location marker which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved spot location marker which provides in the apparatuses and methods of the prior art some of the advantages thereof, while simultaneously overcoming some of the disadvantages normally associated therewith.

Still another object of the present invention is to provide a new and improved spot location marker which is easily transportable as a part of multiple units.

Yet another object of the present invention is to provide a new and improved automatically deployable marker is to provide a new and improved location marker.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
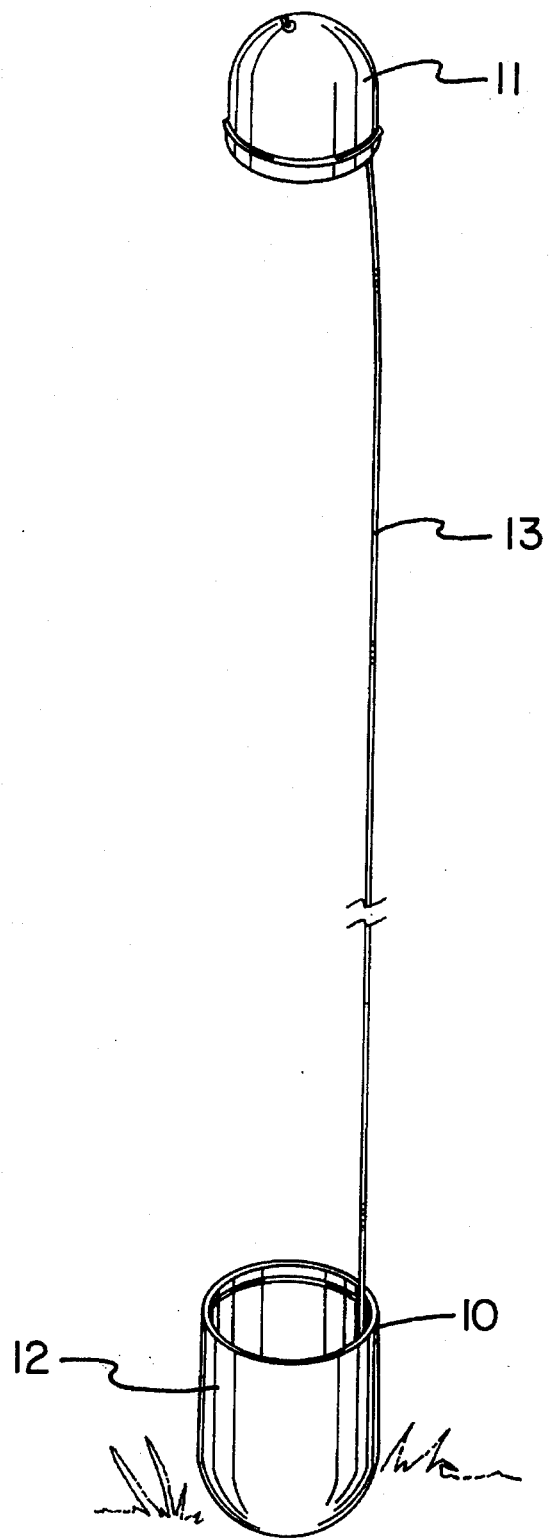
FIG. 1 is a perspective view of the device of the present invention in its deployed state.

With reference now to the drawings, and in particular to FIG. 1 thereof, a new and improved spot location marker embodying the principles and concepts of the present invention and generally designated by the reference numeral 10 will be described.

Figure 2:
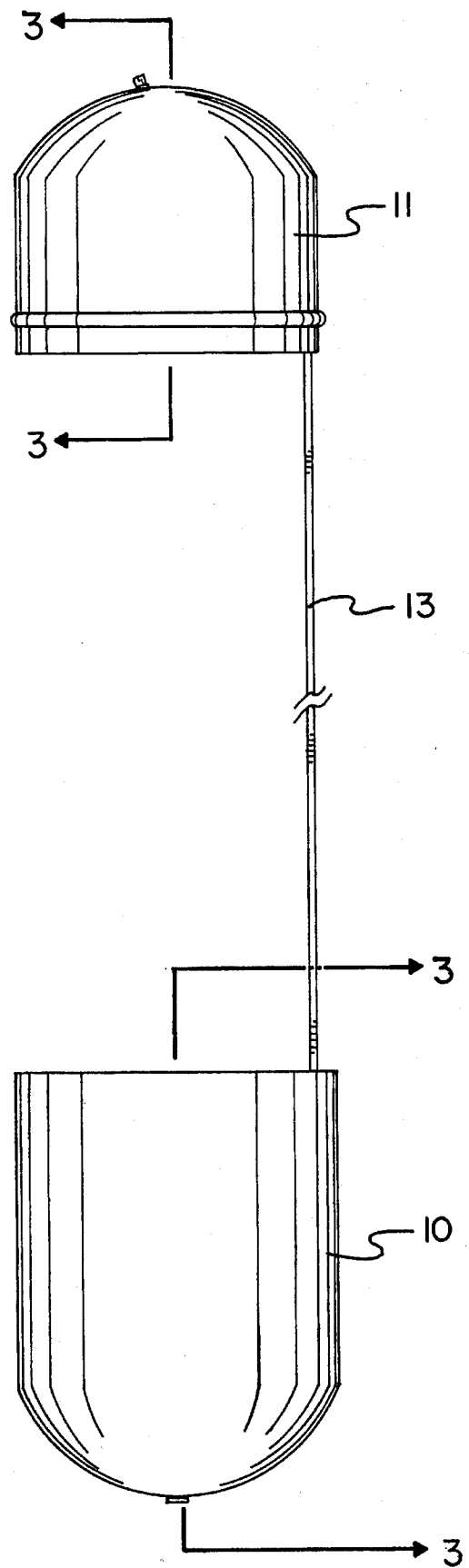
FIG. 2 is a side plan view of the device of FIG. 1.
Figure 3:
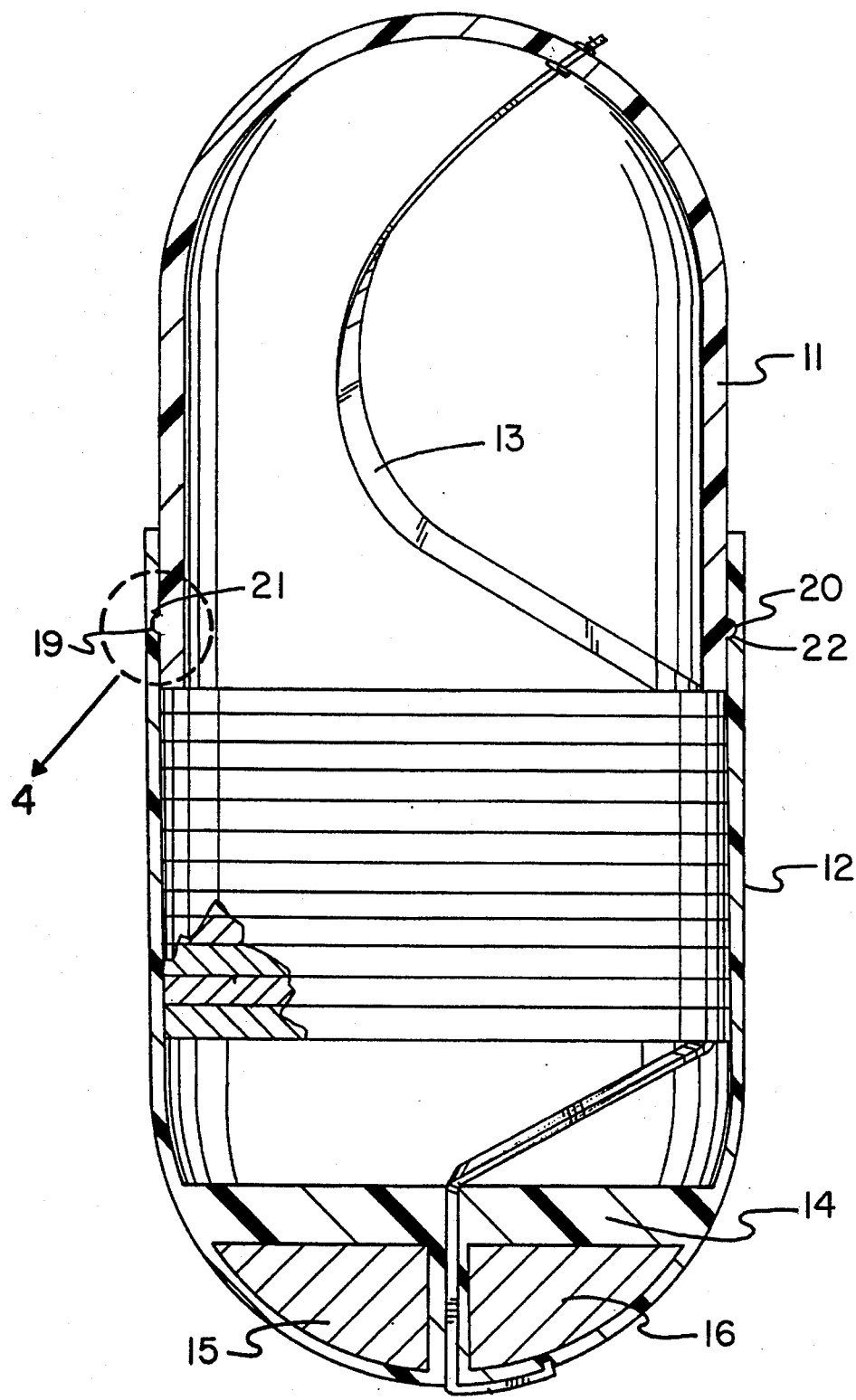
FIG. 3 is a sectional view on lines 3—3 of FIG. 2 with the cylinders in their connected position and the connecting wire in its coiled, stored position.

More specifically, it will be noted that the unit 10 is composed of two segments (here shown as two hollow cylindrical members 11 and 12) connected to each other by a length of stiff spring wire 13. FIG. 2 is a side plan view of the device 10 in the same configuration as that of FIG. 1. As shown in FIG. 3, the second segment 12 is preferably shaped so as to define an outer exterior surface which is substantially hemi-spherical in shape. By this structure, the second segment is permitted to articulate and tilt relative to an unillustrated support surface when the second segment is positioned thereon to attract greater attention to the first segment 11 which will also correspondingly articulate and tilt relative to the support surface.

FIG. 3 is a sectional view showing the two segments 11 and 12 in their mating, undeployed position with the connecting wire 13 coiled within the hollow space within the mating cylindrical sections 11 and 12. Also shown in this Figure is the weighted bottom 14 of segment 12. While a variety of methods may be utilized to accomplish this weighting, i.e. using a thicker sidewall or the like, the version illustrated here utilizes a pair of solid weights 15 and 16 cast in place within cylindrical segment 12. Spring wire 13 is affixed to the ends of segments 11 and 12 in any suitable manner. Also illustrated is one means for providing a releasable connection between the segments 11 and 12 in their mated position. As shown, this consists of a pair of indents 19 and 20 on the exterior surface of segment 12 with a matching pair of shallow protrusions 21 and 22 on the exterior surface of segment 11.

Figure 4:
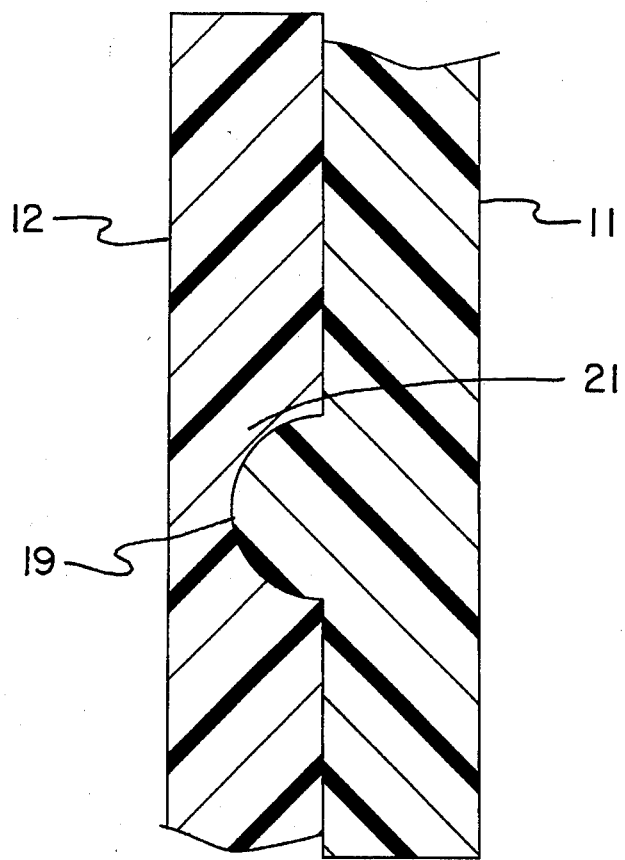
FIG. 4 is a sectional view of the area shown in the circle 4 on FIG. 3.
Figure 5:
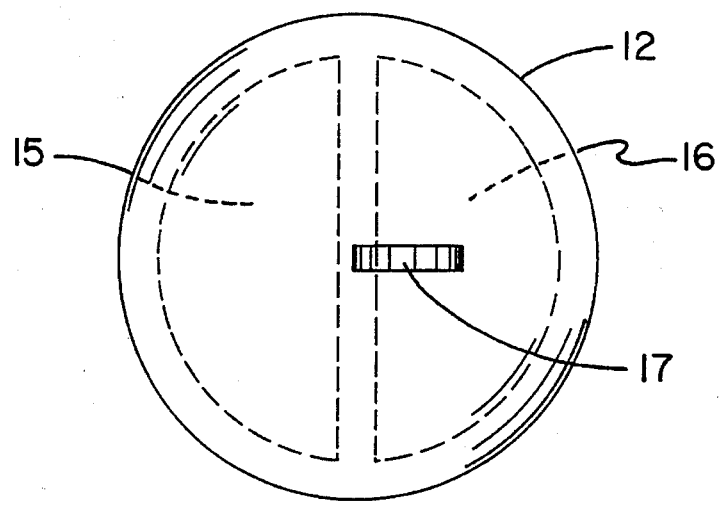
FIG. 5 is a side plan view of the device in FIG. 1 in its closed position.

FIG. 4 is a sectional view of such releasable connection showing the indent 19 and the matching protrusion 21. When dropped or thrown to the ground, the resultant shock will cause protrusion 21 to pop out of indent 19 releasing the segments from each other. When this happens, spring wire 13, no longer being confined will snap out into its extended position as shown in FIGS. 1 and 2, with the upper segment 11 serving as the identifying marker or flag. Due to the weighting of the base of segment 12, the wire section 13 will stand vertically with the cylinder segment 11 displayed at the top thereof.

Preferably the segments 11 and 12 are formed of a rigid thin-walled plastic or steel with the weights 15 and 16 being formed of cast lead. The entire device when in its closed or non-deployed form is preferably small enough to hold in the palm of ones hand, thereby permitting the carrying of a plurality of such devices without difficulty. Also, it is preferred that the segments of the device are brightly colored for reasons of visibility.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed and desired to be protected by LETTERS PATENT of the United States is as follows:

1. A spot location device comprising:

a hollow container having a first segment removably coupled to a second segment;

means releasably holding the segments together responsive to an impact for releasing the segments;

means for weighting the second segment positioned in a bottom portion of the second segment;

a straight length of spring wire wound into a helical configuration within the hollow container, the spring wire having a first end coupled to the first segment of the hollow container and a second end coupled to the second segment of the hollow container, first coupling means for coupling the first end of the spring wire to the first segment of the hollow container, and second coupling means for coupling the second end of the spring wire to the second segment wherein upon releasing of the segments in response to an impact, the spring wire will expand from the helical configuration to extend straight and linearly between the segments to support the first segment in a spaced orientation relative to the second segment.

2. The spot location device of claim 1, wherein the second segment is shaped so as to define an outer exterior surface which is substantially hemi-spherical in shape with said weighting means being mounted proximal to the outer exterior surface such that the weighting of the second segment permits the spring wire to stand vertically.

3. The spot location device of claim 2, wherein the spring wire is shaped so as to define a transverse width and a thickness extending substantially orthogonally relative to a longitudinal length of the spring wire, with the transverse width being substantially greater than the thickness of the spring wire.

4. The spot location device of claim 3, wherein the first end of the spring wire projects through an aperture in the first segment, with the first end of the spring wire being restrained by said first coupling means from removal from the aperture.

5. The spot location device of claim 4, wherein the second end of the spring wire projects through an aperture in the second segment, with the second end of the spring wire being restrained by said second coupling means from removal from the aperture by a bend formed in the second end of the spring wire exteriorly of the second segment.

6. A spot location device comprising:

a hollow container having a first segment and a second segment, the first segment being positioned in a spaced orientation relative to the second segments;

means for releasably holding the segments together and responsive to an impact for releasing the segments when coupled together;

means for weighting the second segment positioned in a bottom portion of the second segment;

a straight length of spring wire extending linearly between the first segment of the hollow container and the second segment of the hollow container, first coupling means for coupling the first end of the spring wire to the first segment of the hollow container, and second coupling means for coupling the second end of the spring wire to the second segment so as to support the first segment in the spaced orientation relative to the second segment, the spring wire having a first end coupled to the first segment and a second end coupled to the second segment, wherein the spring wire can be wound into a helical configuration to permit coupling of the segments together, whereby upon a releasing of the segment in response to an impact, the spring wire will expand from the helical configuration to extend straight and linearly between the segments to support the first segment in the spaced orientation relative to the second segment.

7. The spot location device of claim 6, wherein the second segment is shaped so as to define an outer exterior surface which is substantially hemi-spherical in shape, with said weighting means being mounted proximal to the outer exterior surface such that the weighting of the second segment permits the spring wire to stand vertically.

8. The spot location device of claim 7, wherein the spring wire is shaped so as to define a transverse width and a thickness extending substantially orthogonally relative to a longitudinal length of the spring wire, with the transverse width being substantially greater than the thickness of the spring wire.

9. The spot location device of claim 8, wherein the first end of the spring wire projects through an aperture in the first segment, with the first end of the spring wire being restrained by said first coupling means from removal from the aperture.

10. The spot location device of claim 9, wherein the second end of the spring wire projects through an aperture in the second segment, with the second end of the spring wire being restrained by said second coupling means from removal from the aperture by a bend formed in the second end of the spring wire exteriorly of the second segment.

\* \* \* \* \*